United States Patent [19]

Myers et al.

[11] 4,333,848

[45] Jun. 8, 1982

[54] ATHERMAL LASER GLASS COMPOSITION

[75] Inventors: John D. Myers, Perrysburg, Ohio; Charles S. Vollers, Blissfield, Mich.

[73] Assignee: Kigre, Inc., Toledo, Ohio

[21] Appl. No.: 212,396

[22] Filed: Dec. 3, 1980

[51] Int. Cl.$^3$ .......................... C03C 3/04; C03C 3/16; C09K 11/42
[52] U.S. Cl. .............................. 252/301.4 P; 501/45; 501/48; 501/73
[58] Field of Search .............................. 106/47 Q, 52; 252/301.4 P; 501/45, 48, 73

[56] References Cited

U.S. PATENT DOCUMENTS

| | | | |
|---|---|---|---|
| 4,022,707 | 5/1977 | Deutschbein et al. | 252/301.4 P |
| 4,075,120 | 2/1978 | Myers et al. | 252/301.4 P |
| 4,076,541 | 2/1978 | Rapp | 252/301.4 P |
| 4,239,645 | 12/1980 | Izumitani et al. | 252/301.4 P |
| 4,248,732 | 2/1981 | Myers et al. | 252/301.6 P |

OTHER PUBLICATIONS

Chem Abstracts–88 (1978) item 175994w, p. 357.

*Primary Examiner*—Helen M. McCarthy
*Attorney, Agent, or Firm*—Cullen, Sloman, Cantor, Grauer, Scott & Rutherford

[57] ABSTRACT

A phosphate laser glass in which the optical path length is substantially independent of temperature, or "athermal", particularly under rapid pulsing, and chemically stable, while providing high gain. The base glass composition comprises, in mole percent, 55 to 70% $P_2O_5$, 3 to 15% of an alkali metal oxide, preferably $Li_2O$ plus $K_2O$, 20 to 30% BaO and 0.5 to 5% $Al_2O_3$. Up to 15% of the BaO may be replaced by CaO, SrO or MgO and part of the $Al_2O_3$ may be replaced by $Nd_2O_3$. The total $Al_2O_3$ plus $Nd_2O_3$ is 4 mole percent ±1.5%. The laser glass composition also includes a laseable component, preferably $Nd_2O_3$ and preferably includes a solarization inhibitor.

15 Claims, No Drawings

ATHERMAL LASER GLASS COMPOSITION

BACKGROUND OF THE INVENTION

The present invention relates to inorganic laser glass compositions, particularly phosphate laser glass compositions, which exhibit athermal behavior under high thermal loading, good water and chemical durability and high gain.

Silicate laser glass compositions were developed to replace natural or synthetic laser crystals for commercial and military applications. More recently, phosphate laser glass has generally replaced silicate laser glass in many applications because of the high gain potential of phosphate systems and the inherent disadvantages of silicate systems, as disclosed in U.S. Pat. No. 4,075,120 and the copending application of the assignee, Ser. No. 877,606, now U.S. Pat. No. 4,248,732.

Laser rods have been limited in their ability to generate high average brightness by thermally induced optical distortions. These distortions appear as an increase in beam divergence, accompanied by depolarization of the beam. The distortion of the beam appears to vary directly with the input power to the laser and results in both a change in the cavity "Q" and a degradation and eventual failure of the laser to produce a single pulse, where the laser includes a polarization-sensitive "Q"-switch. Temperature variations are necessarily created in a laser rod or the like during lasing; these temperature variations induce distortions of the optical paths within the laser rod, especially when accentuated by periodic pulsing of the laser.

The prior art has attempted to develop "athermal" laser glass compositions by balancing the constituents of the glass to obtain a negative temperature coefficient of refractive index, dn/dt, based upon the following equation:

$$W = dn/dt + \alpha(n-1)$$

wherein, W is the thermo-optic constant, $\alpha$ is the coefficient of thermal expansion and n is the index of refraction. The change in the thermo-optic constant in a laser rod based upon changes in temperature, is then, as follows:

$$\Delta W = \Delta t[dn/dt + \alpha(n-1)] \times L$$

wherein, $\Delta t$ is the change in temperature and L is the length of the laser rod or lasing body. Unfortunately, several other factors affect the lasing properties of a laser rod or the like, including Young's modulus, etc.

For example, the optical distortion of a plane wave P, averaged for two polarizations, is given by the following formula:

$$P = \beta \frac{\alpha E}{2(1 - \mu)} C_1 + 3C_2$$

wherein, E is Young's modulus, $\mu$ is Poison's ratio, $C_1$ is the photoelastic constant of the glass, perpendicular to stress and $C_2$ is the photoelastic constant parallel to the stress.

The birefringence Q may be determined from the following equation:

$$Q = \frac{\alpha E}{2(1 - \mu)} (C_1 - C_2)$$

wherein, $C_1 - C_2$ is generally accepted as the stress-optic coefficient.

Both experimental and theoretical studies have been performed relating these thermo-optic constants with lasing characteristics. For example, certain tests have established that the distortions of the optical paths inside a lasing element is due to the inhomogeneous temperature field, which is strongly dependent on the average temperature in which the active element is operated. For each type of glass, there is a temperature at which the values of the thermo-optic distortions in one polarization are minimal and are governed only by the temperature drop inside the active elements and the temperature coefficient of the thermo-active constants, see *Solid-State Laser Engineering*, Koechner (1976) Springer-Verlag. The relation of the thermo-optic constant Q above was reported in *Sov. J. Opt. Technol.* Mak, et al., Vol. 38, 553 (1971) which concluded that the output energy per pulse decreases when the average pump power is increased and the rate of this decrease is dependent upon the thermo-optic constant Q, which represents the birefringence of the glass.

As described above, each of the thermo-optic constants W, P and Q are composition and temperature dependent and each may be made individually positive, negative or theoretically zero. However, the combination of W, P and Q, acting together, determine the optical distortion of the laser glass at each temperature profile, within the laser rod. There exists for each combination of the thermo-optic constants, a given temperature profile for which the optical distortion is a minimum.

Thus, contrary to the teaching of the prior art, it is not possible to achieve an athermal laser glass merely by adjusting one or more constituents to achieve a negative temperature coefficient of refractive index. The factors are too complex, requiring an experimental approach based upon all of the known thermo-optic constants.

Another problem with many laser glass compositions suggested by the prior art has been poor water durability. In commercial applications, the temperature of the laser rod is reduced or maintained by a cooling fluid, generally water. The laser rod disclosed herein is water cooled. A laser rod must therefore be stable in the cooling medium.

SUMMARY OF THE INVENTION

As stated above, phosphate glass compositions have replaced silicates for laser rods in many applications, based upon the advantages of phosphate glass laser rods, including a low laser threshold and chemical durability. Phosphate glass laser rods have not however achieved their anticipated potential because of thermally induced optical distortions which have limited the ability of the rod to generate high average brightness. The prior art has attempted to balance the properties of the glass to achieve athermal behavior, however this effort has been only partially successful and at the expense of other equally important properties, particularly gain.

It has now been discovered that it is possible to develop a phosphate laser glass which has high gain, athermal behavior or constant beam divergence, good water or chemical durability and which is capable of handling high thermal loading. This has been accomplished by taking all of the thermo-optic constants into account and experimentally determining the relationship between the constituents which affect these constants.

In the broadest terms, the base phosphate laser glass of this invention comprises, in mole percent, 55 to 70% $P_2O_5$, 3 to 15% of an alkali metal oxide, preferably $Li_2O$ plus $K_2O$, 10 to 30% BaO, 0 to 15% CaO and 0 to 15% SrO, wherein the total RO concentration is 20 to 28% and 0.5 to 5% $Al_2O_3$. The concentrations of the constituents of the base glass composition are given in mole percent to permit one to one substitution of equivalent constituents. In addition, the laser glass of this invention includes a laseable component, preferably $Nd_2O_3$ and a solarization inhibitor. The laser glass composition of this invention includes 0.5 to 11 percent, by weight, $Nd_2O_3$ and 1 to 5 percent, by weight, of a solarization inhibitor selected from the group consisting of $Sb_2O_3$, $Nb_2O_5$ and $SiO_2$. At least part of the $Nd_2O_3$ may be substituted for $Al_2O_3$, such that the total $Al_2O_3$ plus $Nd_2O_3$ is between 2.5 and 5.5 mole percent.

The additions to the base glass composition, including the laseable constituent and the solarization inhibitor, are given in weight percent of the total glass composition because such consituents have been added to the base glass. This method of calculation has greatly facilitated testing of various base glass compositions to determine the affect of variations upon the thermo-optic constants. The preferred embodiment of the base phosphate laser glass of this invention include 6 to 12 mole percent $Li_2O_3$. The most preferred embodiment includes 1 to 3 percent $K_2O$, 0.5 to 4 percent $Al_2O_3$ and the total $Al_2O_3$ plus $Nd_2O_3$ is 4 mole percent $\pm 1\%$.

The preferred laser glass compositions of this invention have an output of 800 millijoules or greater at 40.5 joules input, when pulsed at one pulse per second. The most preferred embodiments have an output of over 1000 millijoules with a threshold of less than 8 joules, when pulsed at one pulse per second. Chemical or water durability in the preferred compositions is less than $6 \times 10^{-6}$ grams/minute/cm$^2$ at 100° C. This is a measurement of the loss in weight of a premeasured sample in boiling distilled water after 60 minutes. Beam divergence was measured by firing the laser through a lens against exposed film located at the focal length of the lens. Little or no beam divergence was measured at one, five and ten pulses per second in the preferred embodiments. That is, the laser beam expanded less than ten percent at high thermal loading. Further, in most cases, the laser rod sustained continuous pulsing at five and ten pulses per second without breakage.

The phosphate laser glass of this invention thus provides substantial improvements over the prior art, including high gain with athermal behavior and good durability. A more detailed description of the preferred embodiments of the laser glass composition of this invention follows.

DESCRIPTION OF THE PREFERRED EMBODIMENTS

The preferred embodiments of the phosphate laser glass composition of this invention may best be described by reference to specific experimental examples which have been formulated and tested. As described above, the constituents of the base glass composition in the following examples are given in mole percent to permit a one to one substitution of equivalent constituents and a direct comparison of the test results. The additions, including the lasing constituent and the antisolarent, are given in weight percent of the total glass composition because these constituents are not changed in most examples. In each of the following examples, a one kilogram melt was formulated and tested. Larger melts of the most preferred embodiments were then made, as described below.

In addition to the examples given hereinbelow, a number of phosphate laser glass compositions were made, tested and rejected because of laser beam divergence or erratic behavior, poor water durability and/or poor laser gain. It was thus determined that phosphate laser glass compositions outside the claimed ranges did not possess the same advantages as the preferred embodiments. The tests were all conducted on laser rods formed from the phosphate laser glass composition. The laser rods tested were cylindrical; ¼ inch diameter and 3¼ inches in length. The ends of the rods were polished plano-plano. The mirrors used in the threshold test were 99.9% and 55% reflective dielectrics having a cavity length of 200 mm. The flash lamp used in an ILC L-336 having a 3 inch arc length and a pulse width of 110 microseconds. A water coolant was used.

Water durability was determined by placing a preweighed and measured sample of laser glass in a beaker of boiling distilled water and measuring the weight loss after 60 minutes. The results are reported in millionths of grams per minute, per square centimeter. It was experimentally determined that a weight loss of less than $6 \times 10^{-6}$ gm/min/cm$^2$ was acceptable for water cooled laser systems.

The rod was installed in the laser system and the mirrors aligned. An initial measurement was taken to determine lasing threshold. Then, the lasing efficiency of the rod was determined at a constant pulse repetition rate of one pulse per second. The energy input was varied and the corresponding lasing output measured up to a maximum input of 40.5 joules.

Beam divergence was measured by firing the laser through a one meter focal length lens at exposed Polaroid film located at the focal point of the lens. A direct comparison could then be made of the beam diameter and shape on the Polaroid film at one pulse per second, five pulses per second and ten pulses per second. This method provides a direct experimental comparison of the thermal properties of the laser glass compositions under high thermal loading. The following are given as Examples of phosphate laser glass compositions.

EXAMPLE 1

A base glass having the following composition in mole percent was formulated:

|  | Mole % | Weight % |
| --- | --- | --- |
| $P_2O_5$ | 65% | 72.46% |
| $Li_2O$ | 10% | 2.35% |
| BaO | 12.5% | 15.05% |
| SrO | 10% | 8.14% |
| $Al_2O_3$ | 2.5% | 2.00% |
|  | 100% | 100.00% |

A lasing component, $Nd_2O_3$ and solarization inhibitors were added to the base glass, as follows, in weight percent of the total composition:

| | |
|---|---|
| Nd$_2$O$_3$ | 3% |
| Nb$_2$O$_5$ | 1% |
| Sb$_2$O$_3$ | 0.5% |

The laser rod formed from this phosphate laser glass composition has a lasing threshold of 8.8 joules and an output of 874 millijoules. Lasing threshold, as used herein, is a measurement of the onset of lasing using a 55 percent output reflector, as described above. The output is a measurement of the gain of the laser in millijoules at 40.5 joules input. Water durability was experimentally determined, as described above, as $5 \times 10^{-6}$ gm/min/cm$^2$, which is considered very acceptable.

The laser system utilized in these tests is described above. The cavity length is 200 mm and the flash lamp was an ILC Technology Incorporated L-336 having a 3-inch arc length and a flash lamp pulse width of 110 microseconds. The pulse firing network was 25 microfarads at 50 microhenrys. The cavity reflectors are silver-plated partial cylinders and the system utilizes water as the coolant.

The beam divergence was measured by firing the laser through a lens at exposed Polaroid film located at the focal length of the lens, as described. In this Example, a slight instability was noted at five pulses per second with a slight divergence of the beam. 261 shots were fired at ten pulses per second until lasing stopped.

EXAMPLE 2

A base glass having the following composition in mole percent was formulated:

| | Mole % | Weight % |
|---|---|---|
| P$_2$O$_5$ | 69% | 74.75% |
| K$_2$O | 5.0% | 3.60% |
| BaO | 13% | 15.21% |
| CaO | 10.5% | 4.49% |
| Al$_2$O$_3$ | 2.5% | 1.95% |
| | 100% | 100.00% |

A lasing component Nd$_2$O$_3$ and solarization inhibitors Nb$_2$O$_5$ and Sb$_2$O$_3$ were added to the base glass composition, as follows, in weight percent of the total composition:

| | |
|---|---|
| Nd$_2$O$_3$ | 3% |
| Nb$_2$O$_5$ | 1% |
| Sb$_2$O$_3$ | 0.5% |

The laser rod formed from this phosphate laser glass composition had a lasing threshold of 8.6 joules and an output of 604 millijoules. The laser beam was found to be somewhat unstable at ten pulses per second and broke following 361 shots. Water durability was experimentally determined to be $13.5 \times 10^{-6}$ gm/min/cm$^2$, which is not acceptable for commercial applications. This Example and all of the following Examples use the laser system described in regard to Example 1.

It was concluded from this Example that the substitution of K$_2$O for Li$_2$O reduced the output or gain of the laser and resulted in further instability of the laser beam. Example 2 thus confirmed that the addition of lithia in Example 1 resulted in a lower expansion glass. It was thus decided to increase the concentration of BaO, which provides a negative temperature coefficient of index, dn/dt, as set forth in Example 3.

EXAMPLE 3

A base glass having the following composition in mole percent was formulated:

| | Mole % | Weight % |
|---|---|---|
| P$_2$O$_5$ | 65% | 69.73% |
| Li$_2$O | 10% | 2.26% |
| BaO | 22.5% | 26.08% |
| Al$_2$O$_3$ | 2.5% | 1.93% |
| | 100% | 100.00% |

A lasing component Nd$_2$O$_3$ and solarization inhibitors Nb$_2$O$_5$ and Sb$_2$O$_3$ were then added to the base glass, as follows, in weight percent of the total composition:

| | |
|---|---|
| Nd$_2$O$_3$ | 3% |
| Nb$_2$O$_5$ | 1% |
| Sb$_2$O$_3$ | 0.5% |

The laser rod formulated from this phosphate laser glass composition had a lasing threshold of 7.6 joules and an output of 1066 millijoules. Water durability was determined experimentally to be $7.5 \times 10^{-6}$ gm/min/cm$^2$, which is slightly greater than acceptable for commercial applications. The laser beam had a slight expansion at five pulses per second, but otherwise appeared to be stable. Comparing this Example with Example 1, it will be seen that the substitution of 22.5 mole percent BaO for 12.5 percent BaO plus 10 percent SrO substantially improved the gain and resulted in a lower lasing threshold. The beam however diverged at five pulses per second and had only 163 shots to cessation of lasing. Thus, it was decided to add K$_2$O to provide a negative dn/dt.

EXAMPLE 4

A base glass having the following composition in mole percent was formulated:

| | Mole % | Weight % |
|---|---|---|
| P$_2$O$_5$ | 65% | 71.57% |
| Li$_2$O | 2.5% | 0.60% |
| K$_2$O | 5.0% | 3.65% |
| BaO | 15% | 17.85% |
| CaO | 10% | 4.35% |
| Al$_2$O$_3$ | 2.5% | 1.98% |
| | 100% | 100.00% |

A lasing constituent and solarization inhibitors were added to the base glass, as follows, in weight percent of the total composition:

| | |
|---|---|
| Nd$_2$O$_3$ | 3% |
| Nb$_2$O$_5$ | 1% |
| Sb$_2$O$_3$ | 0.5% |

The laser rod formulated from this phosphate laser glass composition had a lasing threshold of 8.4 joules and an output of 758 millijoules. Water durability was determined experimentally to be $11.5 \times 10^{-6}$ gm/min/cm$^2$, which is not acceptable for commercial water cooled laser systems. The laser beam had a slight instability at ten pulses per second and provided 363 shots before lasing discontinued. Comparing this Example with Example 2, it will be seen that a slightly better gain was achieved and the laser was more stable. It was decided to increase the concentration of $Al_2O_3$ and $K_2O$ to determine the effect of these changes.

EXAMPLE 5

A base glass having the following composition and mole percent was formulated:

|  | Mole % | Weight % |
| --- | --- | --- |
| $P_2O_5$ | 65% | 70.66% |
| $K_2O$ | 6.5% | 4.69% |
| BaO | 15% | 17.62% |
| CaO | 10% | 4.30% |
| $Al_2O_3$ | 3.5% | 2.73% |
|  | 100% | 100.00% |

A lasing component and solarization inhibitors were added to the base glass, as follows, in weight percent of the total composition:

| $Nd_2O_3$ | 3% |
| --- | --- |
| $Nb_2O_5$ | 1% |
| $Sb_2O_3$ | 0.5% |

The laser rod formed from this phosphate laser glass composition had a lasing threshold of 9.1 joules and an output of 780 millijoules. The tests were repeated because of certain inconsistencies, resulting in a threshold of 8.8 joules and an output of 972 millijoules. Water durability was determined experimentally to be $11.5 \times 10^{-6}$ gm/min/cm$^2$, which is not acceptable for commercial water cooled laser systems. The beam was stable at one pulse per second, five pulses per second and ten pulses per second and lasing continued stable through 421 shots. The laser glass of this Example is therefore more stable and durable, however the glass does not fully achieve the objective of high gain. It was decided therefore to increase the concentration of $K_2O$ and return to a greater concentration of BaO.

EXAMPLE 6

A base glass having the following composition in mole percent was formulated:

|  | Mole % | Weight % |
| --- | --- | --- |
| $P_2O_5$ | 65% | 65.80% |
| $K_2O$ | 7.5% | 5.04% |
| BaO | 25% | 27.34% |
| $Al_2O_3$ | 2.5% | 1.82% |
|  | 100% | 100.00% |

A lasing component and solarization inhibitors were added to the base glass, as follows, in weight percent of the total composition:

| $Nd_2O_3$ | 3% |
| --- | --- |
| $Nb_2O_5$ | 1% |
| $Sb_2O_3$ | 0.5% |

The laser rod formulated from this phosphate laser glass composition had a lasing threshold of 8.8 joules and an output of only 532 millijoules. Water durability was determined experimentally to be $8 \times 10^{-6}$ gm/min/cm$^2$, which is greater than acceptable for commercial water cooled laser systems. It was decided therefore to increase the concentration of $Al_2O_3$ to determine whether an increase would improve water durability. The laser beam was unstable at five and ten pulses per second and the rod discontinued lasing, almost immediately. Comparing this Example with Example 5, it was decided to decrease the concentration of $K_2O$ and increase the concentration of of $Al_2O_3$ to determine whether these changes would increase the stability of the glass while increasing the gain.

EXAMPLE 7

A base glass having the following composition, in mole percent, was formulated:

|  | Mole % | Weight % |
| --- | --- | --- |
| $P_2O_5$ | 65% | 65.77% |
| $K_2O$ | 6.5% | 4.36% |
| BaO | 25% | 27.33% |
| $Al_2O_3$ | 3.5% | 2.54% |
|  | 100% | 100.00% |

A lasing component and solarization inhibitors were then added to the base glass, as follows, in weight percent of the total composition:

| $Nd_2O_3$ | 3% |
| --- | --- |
| $Nb_2O_5$ | 1% |
| $Sb_2O_3$ | 0.5% |

The laser rod formed from this phosphate laser glass composition had a lasing threshold of 8.8 joules and an output of 643 millijoules. Water durability was determined experimentally to be $5.5 \times 10^{-6}$ gm/min/cm$^2$, which is considered acceptable for water cooled laser systems. The improvement in water durability was apparently due to the increase in the concentration of $Al_2O_3$. The laser beam was unstable at five pulses per second and lasing discontinued almost immediately. It was decided therefore to return to a glass composition similar to Example 4 while adjusting the relative concentrations of BaO and CaO to determine the effect of this change upon stability and gain.

EXAMPLE 8

A base glass having the following composition, in mole percent, was formulated:

|  | Mole % | Weight % |
| --- | --- | --- |
| $P_2O_5$ | 65% | 70.26% |
| $Li_2O$ | 2.5% | 0.57% |
| $K_2O$ | 5.0% | 3.59% |
| BaO | 17.5% | 20.44% |
| CaO | 7.5% | 3.20% |
| $Al_2O_3$ | 2.5% | 1.94% |
|  | 100% | 100.00% |

A lasing component and solarization inhibitors were added to the base glass, as follows, in weight percent of the total composition:

| $Nd_2O_3$ | 3% |
| --- | --- |
| $Nb_2O_5$ | 1% |
| $Sb_2O_3$ | 0.5% |

The laser rod formed from this phosphate laser glass composition had a lasing threshold of 9.7 joules and an output of 643 millijoules. Water durability was determined experimentally to be $7.4 \times 10^{-6}$ gm/min/cm², which is slightly greater than acceptable for commercial water cooled laser systems. The laser beam was stable, however a very slight expansion was noted at five pulses per second. Thus, the addition of CaO improved the stability of the glass, however the threshold was high and the gain was low. The glass was relatively strong, continuing for 332 shots before lasing discontinued. It was decided therefore to return to Example 3, but include both $Li_2O$ and $K_2O$ to improve the stability of the glass.

EXAMPLE 9

A base glass having the following composition, in mole percent, was formulated:

|  | Mole % | Weight % |
| --- | --- | --- |
| $P_2O_5$ | 65% | 68.90% |
| $Li_2O$ | 7.5% | 1.67% |
| $K_2O$ | 2.5% | 1.76% |
| BaO | 22.5% | 25.77% |
| $Al_2O_3$ | 2.5% | 1.90% |
|  | 100% | 100.00% |

A lasing component and solarization inhibitors were then added to the base glass, as follows, in weight percent of the total composition:

| $Nd_2O_3$ | 3% |
| --- | --- |
| $Nb_2O_5$ | 1% |
| $Sb_2O_3$ | 0.5% |

The laser rod formed from this phosphate laser glass composition had a lasing threshold of 8.0 joules and an output of 880 millijoules. Water durability was experimentally determined to be $5.9 \times 10^{-6}$ gm/min/cm², which is considered acceptable for commercial water cooled laser systems. A slight expansion in the laser beam was noted at five pulses per second, but then became stable. A slight instability was also noted at ten pulses per second. It was decided therefore to increase the concentration of BaO to 25% and eliminate the $K_2O$ to determine the effect of these changes upon gain and stability.

EXAMPLE 10

A base glass having the following composition, in mole percent, was formulated:

|  | Mole % | Weight % |
| --- | --- | --- |
| $P_2O_5$ | 65% | 68.15% |
| $Li_2O$ | 7.5% | 1.66% |
| BaO | 25% | 28.31% |
| $Al_2O_3$ | 2.5% | 1.88% |
|  | 100% | 100.00% |

A lasing component and solarization inhibitors were then added to the base glass, as follows, in weight percent of the total composition:

| $Nd_2O_3$ | 3% |
| --- | --- |
| $Nb_2O_5$ | 1% |
| $Sb_2O_3$ | 0.5% |

The laser rod formed from this phosphate laser glass composition had a lasing threshold of 8.0 joules and an output of 791 millijoules. Water durability was determined experimentally to be $4 \times 10^{-6}$ gm/min/cm², which is considered very acceptable for commercial water cooled laser systems. The laser beam expanded at five pulses per second and was unstable at ten pulses per second. The laser rod broke after 200 shots. It was thus decided to increase the concentration of $Li_2O$ and $Al_2O_3$ to obtain a more stable laser glass as set forth in the next example.

EXAMPLE 11

A base glass having the following composition, in mole percent, was formulated:

|  | Mole % | Weight % |
| --- | --- | --- |
| $P_2O_5$ | 65% | 69.36% |
| $Li_2O$ | 9% | 2.02% |
| BaO | 22.5% | 25.94% |
| $Al_2O_3$ | 3.5% | 2.68% |
|  | 100% | 100.00% |

A lasing component and solarization inhibitors were then added to the base glass, as follows, in weight percent of the total composition:

| $Nd_2O_3$ | 3% |
| --- | --- |
| $Nb_2O_5$ | 1% |
| $Sb_2O_3$ | 0.5% |

The laser rod formed from this phosphate laser glass composition had a lasing threshold of 8.4 joules and an output of 890 millijoules. Water durability was determined experimentally to be $3.7 \times 10^{-6}$ gm/min/cm², which is very acceptable for commercial water cooled laser systems. The laser continued for 267 shots before lasing discontinued. The laser beam expanded and was slightly unstable at five pulses per second. It will be noted that the changes in the base glass composition resulted in improved gain and stability. It was thus decided to attempt to combine the advantages of Examples 3 and 9 by using both $Li_2O$ and $K_2O$ as set forth in the next Example.

EXAMPLE 12

A base glass having the following composition, in mole percent, was formulated:

|  | Mole % | Weight % |
| --- | --- | --- |
| $P_2O_5$ | 65% | 69.23% |
| $Li_2O$ | 8.5% | 1.91% |
| $K_2O$ | 1.5% | 1.06% |
| BaO | 22.5% | 25.89% |
| $Al_2O_3$ | 2.5% | 1.91% |
|  | 100% | 100.00% |

A lasing component and solarization inhibitors were then added to the base glass, as follows, in weight percent of the total composition:

|        |        |
|--------|--------|
| $Nd_2O_3$ | 3%     |
| $Nb_2O_5$ | 1%     |
| $Sb_2O_3$ | 0.5%   |

The laser rod formed from this phosphate laser glass of composition had a lasing threshold of only 7.8 joules and an output of 1005 millijoules. Water durability was experimentally determined to be $5.5 \times 10^{-6}$ gm/min/cm$^2$, which is considered acceptable for commercial water cooled systems. The laser beam was stable at one, five and ten pulses per second. This glass composition was therefore considered one of the most preferred and promising compositions tested.

EXAMPLE 13

A base glass having the following composition, in mole percent, was formulated:

|           | Mole % | Weight % |
|-----------|--------|----------|
| $P_2O_5$  | 66%    | 69.47%   |
| $Li_2O$   | 7.5%   | 1.66%    |
| $K_2O$    | 1.5%   | 1.05%    |
| BaO       | 22.5%  | 25.93%   |
| $Al_2O_3$ | 2.5%   | 1.89%    |
|           | 100%   | 100.00%  |

A lasing component and solarization inhibitors were then added to the base glass, as follows, in weight percent of the total composition.

|           |      |
|-----------|------|
| $Nd_2O_3$ | 3%   |
| $Nb_2O_5$ | 1%   |
| $Sb_2O_3$ | 0.5% |

The laser rod formed from this phosphate laser glass composition had a lasing threshold of 7.8 joules and a measured output of only 582 millijoules. Water durability was determined experimentally to be $4.7 \times 10^{-6}$ gm/min/cm$^2$, which is very acceptable for commercial water cooled laser systems. The laser beam was slightly unstable at five pulses per second and unstable at ten pulses per second. The low gain and instability can not be explained from the formulation and it is believed that either a mistake in formulation or testing occurred.

EXAMPLE 14

A base glass having the following composition, in mole percent, was formulated:

|           | Mole % | Weight % |
|-----------|--------|----------|
| $P_2O_5$  | 65%    | 68.09%   |
| $Na_2O$   | 10%    | 4.57%    |
| BaO       | 22.5%  | 25.46%   |
| $Al_2O_3$ | 2.5%   | 1.88%    |
|           | 100%   | 100.00%  |

A lasing component and solarization inhibitors were then added to the base glass, as follows, in weight percent of the total composition:

|           |      |
|-----------|------|
| $Nd_2O_3$ | 3%   |
| $Nb_2O_5$ | 1%   |
| $Sb_2O_3$ | 0.5% |

The laser rod formed from this phosphate laser glass composition had a lasing threshold of 8.0 joules and an output of only 582 millijoules. Water durability was experimentally determined to be $7.8 \times 10^{-6}$ gm/min/cm$^2$, which is not acceptable for commercial water cooled laser systems. Further, the laser beam was unstable at five pulses per second and substantially reduced at ten pulses per second. It was decided therefore that the substitution of $Na_2O$ for $Li_2O$ and $K_2O$ was unacceptable, at least in this glass composition. It will be noted however that $Na_2O$ was added to $Li_2O$ in Example 16, as described below.

It was decided before to pursue minor variations in the glass composition of Example 12 by varying the relative concentration of $Li_2O$ and $K_2O$ as set forth in the next Example.

EXAMPLE 15

A base glass having the following composition, in mole percent, was formulated:

|           | Mole % | Weight % |
|-----------|--------|----------|
| $P_2O_5$  | 65%    | 69.38%   |
| $Li_2O$   | 8.5%   | 1.91%    |
| $K_2O$    | 2.0%   | 1.42%    |
| BaO       | 22%    | 25.37%   |
| $Al_2O_3$ | 2.5%   | 1.92%    |
|           | 100%   | 100.00%  |

A lasing component and solarization inhibitors were then added to the base glass, as follows, in weight percent of the total composition:

|           |      |
|-----------|------|
| $Nd_2O_3$ | 3%   |
| $Nb_2O_5$ | 1%   |
| $Sb_2O_3$ | 0.5% |

The laser rod formed from this phosphate laser glass composition had a lasing threshold of 8.8 joules and an output of 840 millijoules. Water durability was determined experimentally to be $5.2 \times 10^{-6}$ gm/min/cm$^2$, which is considered acceptable for commercial water cooled laser systems. The laser beam was slightly unstable at five pulses per second. It was decided therefore to substitute $Na_2O$ for $K_2O$ and determine the effect of this change.

EXAMPLE 16

A base glass having the following composition, in mole percent, was formulated:

|           | Mole % | Weight % |
|-----------|--------|----------|
| $P_2O_5$  | 65%    | 69.49%   |
| $Li_2O$   | 8.5%   | 1.91%    |
| $Na_2O$   | 1.5%   | 0.70%    |
| BaO       | 22.5%  | 25.98%   |
| $Al_2O_3$ | 2.5%   | 1.92%    |
|           | 100%   | 100.00%  |

A lasing component and solarization inhibitors were then added to the base glass, as follows, in weight percent of the total composition.

|           |    |
|-----------|----|
| $Nd_2O_3$ | 3% |
| $Nb_2O_5$ | 1% |

-continued

| | |
|---|---|
| $Sb_2O_3$ | 0.5% |

The laser rod formed from this phosphate laser glass composition had a lasing threshold of 9 joules and an output of 750 millijoules. Water durability was determined experimentally to be $5.8 \times 10^{-6}$ gm/min/cm$^2$, which is considered acceptable for most commercial water cooled laser systems. The laser beam was slightly unstable at ten pulses per second. No breakage occurred of the rod at 400 watts. The increase in the lasing threshold and decrease in gain, however, indicated that, in the preferred embodiment, $Na_2O$ can not be substituted for $K_2O$ in the phosphate laser glass of this invention.

EXAMPLE 17

A base glass having the following composition, in mole percent, was formulated:

| | Mole % | Weight % |
|---|---|---|
| $P_2O_5$ | 63% | 67.69% |
| $Li_2O$ | 8.6% | 1.95% |
| $K_2O$ | 1.5% | 1.07% |
| BaO | 22.8% | 26.47% |
| CaO | 3.1% | 1.32% |
| $Al_2O_3$ | 1% | 1.51% |
| | 100% | 100.00% |

Eight percent by weight of the total composition of $Nd_2O_3$ was added to the base glass as the lasing component together with one weight percent $Nb_2O_5$ and 0.5 percent $Sb_2O_3$. The laser rod formed from this phosphate laser glass composition had a lasing threshold of 7.0 joules and a gain of 1310 millijoules. Water durability was experimentally determined to be $4.5 \times 10^{-6}$ gm/min/cm$^2$, which is very acceptable for commercial water cooled laser systems. The laser beam increased slightly at five pulses per second, but remained stable. The laser rod did not break at 400 watts.

This Example illustrates the fact that it is possible to substitute $Nd_2O_3$ for $Al_2O_3$ and thereby improve the gain. It was decided therefore to continue this line of investigation in the following Examples.

EXAMPLE 18

A base glass having the following composition, in mole percent, was formulated:

| | Mole % | Weight % |
|---|---|---|
| $P_2O_5$ | 63% | 67.69% |
| $Li_2O$ | 8.6% | 1.95% |
| $K_2O$ | 1.5% | 1.07% |
| BaO | 22.8% | 26.47% |
| CaO | 3.1% | 1.32% |
| $Al_2O_3$ | 1.% | 1.51% |
| | 100% | 100.00% |

Nine percent by weight of the total composition of $Nd_2O_3$ was added to the base glass composition as the lasing component. One weight percent $Nb_2O_5$ and 0.5 percent $Sb_2O_3$ were added as solarization inhibitors. The laser rod formed from this phosphate laser glass composition had a lasing threshold of only 6.7 joules and an output of 1050 millijoules. A slight weight gain was measured experimentally in the test for water durability. It was determined that little or no loss resulted in the test. The laser beam was stable, but the rod broke under continued pulsing. This Example further illustrates the fact that it is possible to substitute $Nd_2O_3$ for $Al_2O_3$, however the glass appears to be nearly saturated with $Nd_2O_3$ and has a somewhat reduced strength.

EXAMPLE 19

A base glass having the following composition, in mole percent, was formulated:

| | Mole % | Weight % |
|---|---|---|
| $P_2O_5$ | 63.5% | 68.59% |
| $Li_2O$ | 8.7% | 1.98% |
| $K_2O$ | 1.6% | 1.15% |
| BaO | 23.1% | 26.97% |
| CaO | 3.1% | 1.32% |
| | 100% | 100.00% |

Eleven percent by weight of the total composition of $Nd_2O_3$ was added to the base glass as the lasing component and one weight percent $Nb_2O_5$ and 0.5 weight percent $Sb_2O_3$ were added as solarization inhibitors. The laser rod formed from this phosphate laser glass composition had a lasing threshold of 7.2 joules and an output of 1010 millijoules. Water durability was determined experimentally to be $8.5 \times 10^{-6}$ gm/min/cm$^2$, which is not acceptable for commercial water cooled laser systems. The laser rod further exhibited reduced strength and the glass appeared to be saturated with $Nd_2O_3$. It was decided therefore that the preferred phosphate laser glass composition should include at least one-half mole percent $Al_2O_3$.

EXAMPLE 20

The following Example illustrates the affect of neodymium doping upon durability. A base glass having the same composition as Example 12 was formulated, as follows:

| | Mole % | Weight % |
|---|---|---|
| $P_2O_5$ | 65% | 69.23% |
| $Li_2O$ | 8.5% | 1.91% |
| $K_2O$ | 1.5% | 1.06% |
| BaO | 22.5% | 25.89% |
| $Al_2O_3$ | 2.5% | 1.91% |
| | 100% | 100.00% |

Seven percent by weight $Nd_2O_3$ was then added to the base glass composition and solarization inhibitors were added, as follows, in weight percent of the total composition:

| | |
|---|---|
| $Nd_2O_3$ | 7% |
| $Nb_2O_5$ | 1% |
| $Sb_2O_3$ | 0.5% |

The laser glass rod formed from this phosphate laser glass composition had a threshold of 7.0 joules and an output or gain of 1070 millijoules with an input of 40.5 joules, which compares favorably with the gain of the glass composition of Example 12. More importantly, the water durability was $3.7 \times 10^{-6}$ gm/min/cm$^2$, which is substantially better than Example 12 and which is considered very acceptable for commercial water cooled laser systems. Unfortunately, this glass exhibited instability at five pulses per second, which stabilized at ten pulses per second. Thus, it was decided that $Nd_2O_3$ should be substituted for $Al_2O_3$, rather than merely increasing the concentration of $Nd_2O_3$, which was experimentally confirmed in the following Examples.

EXAMPLE 21

A base glass having the following composition, in mole percent, was formulated:

|  | Mole % | Weight % |
|---|---|---|
| $P_2O_5$ | 65.8% | 69.87% |
| $Li_2O$ | 8.6% | 1.92% |
| $K_2O$ | 1.5% | 1.06% |
| BaO | 22.8% | 26.16% |
| $Al_2O_3$ | 1.3% | 0.99% |
|  | 100% | 100.00% |

Six weight percent (about 2.5 mole percent) $Nd_2O_3$ and solarization inhibitors were added to the base glass composition, as follows, in weight percent of the total composition:

| $Nd_2O_3$ | 6% |
|---|---|
| $Nb_2O_5$ | 1% |
| $Sb_2O_3$ | 0.5% |

The laser rod formed from the phosphate laser glass composition of this Example had a lasing threshold of 7.0 joules and an output or gain of 1000 millijoules. Water durability was determined experimentally to be $6.6 \times 10^{-6}$ gm/min/cm$^2$, which is greater than acceptable for commercial water cooled laser systems.

The laser beam was slightly unstable at five and ten pulses per second, resulting in an oblong pattern on the film. The laser rod did not break in the test. Based upon this experience, it was decided to eliminate the $Al_2O_3$ and substitute $Nd_2O_3$, as set forth in the following Example.

EXAMPLE 22

A base glass having the following composition, in mole percent, was formulated.

|  | Mole % | Weight % |
|---|---|---|
| $P_2O_5$ | 64.6% | 69.30% |
| $Li_2O$ | 8.7% | 1.92% |
| $K_2O$ | 1.5% | 1.06% |
| CaO | 2.1% | 0.89% |
| BaO | 23.1% | 26.77% |
| $Al_2O_3$ | 0% | 0.00% |
|  | 100% | 100.00% |

Nine percent by weight $Nd_2O_3$ was substituted for the $Al_2O_3$, as follows, in weight percent of the total composition:

| $Nd_2O_3$ | 9% |
|---|---|
| $Nb_2O_5$ | 1% |
| $Sb_2O_3$ | 0.5% |

The laser rod formed from this phosphate laser glass composition had a lasing threshold of 8 joules and an output or gain of 690 millijoules with an input of 40.5 joules. It was thus determined experimentally that substitution of all of the $Al_2O_3$ by $Nd_2O_3$ resulted in a substantial reduction in gain. Thus, the most preferred embodiments include at least 0.5 mole percent $Al_2O_3$.

The water durability was determined experimentally for this laser glass composition to be $5.5 \times 10^{-6}$ gm/min/cm$^2$, which is acceptable for commercial water cooled laser systems. A slight instability in the laser beam was noted at five pulses per second and the beam became unstable at ten pulses per second. Based upon this instability of the laser beam, it was decided to formulate a similar laser glass composition including $Al_2O_3$, which is found in the following Example.

EXAMPLE 23

A base glass having the following composition, in mole percent, was formulated:

|  | Mole % | Weight % |
|---|---|---|
| $P_2O_5$ | 66.5% | 70.51% |
| $Li_2O$ | 8.5% | 1.90% |
| $K_2O$ | 1.5% | 1.06% |
| BaO | 22.5% | 25.77% |
| $Al_2O_3$ | 1.0% | 0.76% |
|  | 100% | 100.00% |

The laser glass composition was doped with nine percent neodymium oxide, as follows, in weight percent of the total composition:

| $Nd_2O_3$ | 9% |
|---|---|
| $Nb_2O_5$ | 1% |
| $Sb_2O_3$ | 0.5% |

The laser rod formed from this phosphate laser glass composition had a lasing threshold of 7.4 joules and an output or gain of 980 millijoules with an input of 40.5 joules. Water durability was experimentally determined to be $2.9 \times 10^{-6}$ gm/min/cm$^2$, which is excellent and quite satisfactory for commercial water cooled laser glass systems. The laser beam was quite stable at one, five and ten pulses per second. The laser glass of this composition was thus considered to be quite commercial.

EXAMPLE 24

This Example is given in weight percent because the glass composition is not considered experimental and therefore it is unlikely that any significant modification or substitution will be made.

A laser glass having the following composition was made;

|  | Glass Weight % | Glass Mole % | Base Glass Mole % |
|---|---|---|---|
| $P_2O_5$ | 59.31% | 58.5% | 61.28% |
| $Li_2O$ | 1.92% | 9.0% | 9.43% |
| $K_2O$ | 1.06% | 1.58% | 1.65% |
| CaO | 0.86% | 2.15% | 2.25% |
| BaO | 25.94% | 23.69% | 24.80% |
| $Al_2O_3$ | 0.41% | 0.56% | 0.59% |
| $Nd_2O_3$ | 9.0% | 3.75% | 100% |
| $Nb_2O_5$ | 1.0% | 0.53% |  |
| $Sb_2O_3$ | 0.5% | 0.24% |  |
|  | 100% | 100% |  |

The laser rod formed from this glass composition had a lasing threshold of 6.7 joules and a gain or output of 1225 millijoules with an input of 40.5 joules. Water durability was experimentally determined to be $5 \times 10^{-6}$ gm/min/cm$^2$, which is considered very acceptable for commercial water cooled laser systems.

The laser beam was stable at one, five and ten pulses per second and the laser rod did not break under repeated pulsing. Thus, the laser glass composition of this Example is considered to be very commercial.

It should be noted that the composition of Example 24 is the final or actual composition of the glass in weight percent, determined from the glass after casting. The previous Examples disclose the batch composition of the base glass in mole percent and the additives in weight percent. The mole percent of the cast glass of Example 24 was then calculated from the weight percent. Finally, the base glass composition was calculated in mole percent for comparison with the previous Examples.

It has been determined from similar comparisons of the cast glass composition with the batch compositions that approximately fifteen percent of the phosphorus pentoxide ($P_2O_5$) was lost during melting and casting. Thus, it was decided to add more of the $P_2O_5$ as a complex, particularly barium phosphate, Ba(PO$_3$)$_3$, or lithium phosphate Li$_3$PO$_4$ or potassium phosphate, K$_4$P$_2$O$_7$. This reduced the $P_2O_5$ and therefore the $P_2O_5$ losses. By this method, it was found possible to reduce the $P_2O_5$ losses to about ten percent, or less. Ten weight percent of free $P_2O_5$ is therefore added to the base glass composition of the Examples above to make up for the loss.

Following the one kilogram experimental Examples above, larger melts, 4 kg to 20 kg, were formulated to establish production processes and procedures. During the initial larger melts, it was determined that phosphate was volatilizing from the melts as described above. This phosphate loss shifted the base theoretical composition of the Examples to a lower $P_2O_5$ level, down about five mole percent, while raising the levels of the other constituents in proportion to the individual theoretical levels.

For example, a six kilogram melt of the composition of Example 12 was formulated based upon the following batch composition, given hereinabove:

| Constituent | Batch Mole % | Batch Weight % | Batch Weight % with additives |
|---|---|---|---|
| $P_2O_5$ | 65% | 69.23% | 66.12% |
| $Li_2O$ | 8.5% | 1.91% | 1.82% |
| $K_2O$ | 1.5% | 1.06% | 1.01% |
| BaO | 22.5% | 25.89% | 24.73% |
| $Al_2O_3$ | 2.5% | 1.91% | 1.82% |
| $Nd_2O_3$ | | | 3% |
| $Nb_2O_5$ | | | 1% |
| $Sb_2O_3$ | | | 0.5% |

After melting, the glass yield was weighed and, accounting for all incidental losses, it was determined that approximately 680 grams of $P_2O_5$ was lost through volatilization. This loss of $P_2O_5$ resulted in the following actual glass composition:

| Constituent | Glass Weight % | Glass Mole % | Base Glass Weight % | Base Glass Mole % |
|---|---|---|---|---|
| $P_2O_5$ | 61.79% | 59.30% | 65.09% | 60.63% |
| $Li_2O$ | 2.05% | 9.35% | 2.16% | 9.56% |
| $K_2O$ | 1.14% | 1.65% | 1.22% | 1.69% |
| BaO | 27.88% | 24.77% | 29.37% | 25.33% |
| $Al_2O_3$ | 2.05% | 2.74% | 2.16% | 2.80% |
| $Nd_2O_3$ | 3.38% | 1.36% | | |
| $Nb_2O_5$ | 1.13% | 0.58% | | |
| $Sb_2O_3$ | 0.56% | 0.26% | | |

It was experimentally determined that the loss of phosphate through volatilization is affected by composition, raw materials, formulation and processing time and temperature. As described above, this loss may be controlled by using phosphate compounds, such as barium phosphate, lithium phosphate, etc. Further, in the Examples above, the $P_2O_5$ concentration in the final laser glass is about ten percent less than the batch composition, which is a loss of about five mole percent.

The preferred raw materials for the glass composition of this invention include anhydrous phosphorus pentoxide, lithium orthophosphate, potassium pyrophosphate, barium metaphosphate, barium fluoride, aluminum oxide, aluminum fluoride, aluminum metaphosphate, calcium pyrophosphate, aluminum phosphate, strontium fluoride, magnesium and the remainder of the constituents preferably in oxide form, although they may also be fluorides of phosphates.

In the preferred embodiments, the raw materials are reduced to molten condition in a quartz crucible, adding small amounts of silica to the melt. The melt is then homogenized and refined in a platinum crucible. In the melting process, fluorine gas is evolved, particularly in the quartz crucible. Oxygen gas may then be introduced into the melt to convert the fluorides to oxides. The molten glass is then cast, using standard techniques and annealed.

The following conclusions may be drawn from the Examples above. $K_2O$ and BaO appear to be major factors in lowering or providing a negative dn/dt, however increasing the concentration of $K_2O$ above about three mole percent appears to adversely affect the strength of the laser rod. Additions of SrO, CaO and MgO, in decending order, further reduce the temperature coefficient of index, however $Al_2O_3$ is highly positive. Further, the addition of lithia reduces the output or gain of the glass. Thus, the most preferred embodiment of the phosphate laser glass of this invention includes both $Li_2O$ and $K_2O$, but includes a greater percentage of $Li_2O$ and a relatively small percent of $K_2O$. The glass composition preferably includes about 20 to 30 mole percent BaO, however up to about 10 mole percent CaO or SrO may be substituted for BaO, provided the composition includes at least about 10 to 15 mole percent BaO. The preferred composition also includes at least 0.5 mole percent $Al_2O_3$. It is noted however that $Nd_2O_3$ may be substituted for $Al_2O_3$, but the substitution is not direct in the above Examples and the preferred compositions include a relatively narrow range of $Al_2O_3$ plus $Nd_2O_3$, as described below.

The relation between the gain of a phosphate laser glass and water durability was found experimentally to be dependent upon the concentrations of $Al_2O_3$ and $Nd_2O_3$ in a complex relation. In general, the principles controlling gain and water durability are as follows. Increases in the concentration of $Al_2O_3$ improves the water durability of the phosphate laser glass, but tends to decrease the gain. An increase in the $Nd_2O_3$ concentration decreases the fluorescent lifetime of a phosphate laser glass, thus tending to decrease the gain. However, an increase the neodymium concentration also increases the absorption by the laser glass of the flashlamp pump light, thereby tending to increase the gain of the laser glass.

It has been discovered that there exists a level of neodymium oxide concentration where the increase in absorption of the flashlamp pump light is offset by the decrease in fluorescent lifetime due to concentration quenching. This level, or point of diminishing return, is indicated by that point wherein the gain of the laser glass no longer increases with an increase in neodymium oxide concentration. It was determined experimentally that the gain of a phosphate laser glass having the general composition herein disclosed increases with increases in the consentration of neodymium oxide until the concentration reaches about ten percent by weight, when the gain decreases due to the decrease in the fluorescent lifetime. The fluorescent lifetime of the phosphate laser glass decreases in a generally straight line function from about 350 microseconds at two weight percent $Nd_2O_3$ to less than 100 microseconds at twelve weight percent $Nd_2O_3$.

In order to maintain an acceptable water durability, it has been determined experimentally that the loss due to water should not be greater than about $6 \times 10^{-6}$ gm/min/cm$^2$ at 100° C. It has now been determined that the sum of the concentrations of $Al_2O_3$ and $Nd_2O_3$ should be at least 2.5 mole percent and less than about 5.5 mole percent. More preferably, the sum of the concentrations of $Al_2O_3$ and $Nd_2O_3$ is four mole percent plus or minus one percent. This concentration was determined experimentally as follows.

The water durability of Example 12 was $5.5 \times 10^{-6}$ gm/min/cm$^2$, which is acceptable for commercial water cooled laser systems. Example 12 includes 2.5 mole percent $Al_2O_3$ and three weight percent $Nd_2O_3$. Three weight percent $Nd_2O_3$ equals about 0.6 mole percent. Thus, the sum of $Al_2O_3$ and $Nd_2O_3$ in Example 12 is 3.1 mole percent. It has also been determined experimentally that this combination of $Al_2O_3$ plus $Nd_2O_3$ is important to maintaining a stable laser beam. The laser glass composition of Example 12 has a stable beam, however a beam divergence was noted in the composition of Example 17 which includes eight percent by weight of the total composition of $Nd_2O_3$. Glass compositions having 2.5 mole percent $Al_2O_3$ plus six weight percent $Nd_2O_3$ were also found to be unstable. Glass compositions having 2.5 percent $Al_2O_3$ and two to four weight percent $Nd_2O_3$ were found stable. Example 24, which has a stable beam, and is water durable, has 0.56 mole percent $Al_2O_3$, plus 3.75 mole percent $Nd_2O_3$. In order to stabilize the laser beam divergence at nine weight percent $Nd_2O_3$, it was thus found necessary to decrease the concentration of $Al_2O_3$. This decrease also had the desired effect of augmenting an increase in gain. Further, the increase in the concentration of $Nd_2O_3$ improved the water durability of the laser glass sufficiently to permit a reduction in the concentration of $Al_2O_3$. Examples 23 and 24 illustrate good commercial glass compositions having a high concentration of $Nd_2O_3$. At the opposite end of the scale, the concentration of $Al_2O_3$ must be increased to about three mole percent where low concentrations of $Nd_2O_3$ are used to maintain laser beam stability and good water durability.

Based upon these conclusions, the base glass of the phosphate laser glass of this invention includes the following, in mole percent: $P_2O_5$ 55 to 70%, $Li_2O$ and $K_2O$ 3 to 15%, BaO 10 to 30%, CaO 0 to 15%, SrO 0 to 15%, $Al_2O_3$ 0.5 to 5% wherein the total of BaO, CaO and SrO is at least 15 mole percent and the total of $Al_2O_3$ plus $Nd_2O_3$ is 2.5 to 5.5 mole percent. The phosphate laser glass also includes a lasing component, preferably $Nd_2O_3$ and a solarization inhibitor. As described above, the preferred laser glass compositions include $Li_2O$ and a greater concentration of $R_2O$, as follows, in mole percent: $P_2O_5$ 55 to 65%, $Li_2O$ 3 to 15%, $K_2O$ 0 to 10%, BaO 12 to 28%, CaO 0 to 15%, SrO 0 to 15%, $Al_2O_3$ 0.5 to 4%, wherein the total of BaO, CaO and SrO is 25 to 30% and the total of $Al_2O_3$ plus $Nd_2O_3$ is four mole percent $\pm$ 1%. As described above, the total glass composition includes a lasing component and a solarization inhibitor. More preferably, the base glass composition comprises the following, in mole percent: $P_2O_5$ 55 to 65%, $Li_2O$ 6 to 12%, $K_2O$ 0 to 10%, BaO 15 to 28%, CaO 0 to 10%, SrO 0 to 10%, $Al_2O_3$ 1 to 4%, wherein the total $Li_2O$ plus $K_2O$ is 7 to 15 mole percent and the total BaO, CaO and SrO is 20 to 28% and the total $Al_2O_3$ plus $Nd_2O_3$ is 4 $\pm$ 1 mole percent. The total glass composition includes 0.5 to 10 percent, by weight of the lasing component, preferably $Nd_2O_3$. Finally, the most preferred base glass composition includes the following, in mole percent: $P_2O_5$ 55 to 65%, $Li_2O$ 6 to 12%, $K_2O$ 1 to 3%, BaO 20 to 26%, CaO 0 to 10%, SrO 0 to 10%, $Al_2O_3$ 0.5 to 3%, wherein CaO and SrO may be substituted for BaO in concentrations up to 10 percent and the total glass composition includes 0.5 to 10 percent, by weight of a lasing component, preferably $Nd_2O_3$ and 0.5 to 5 percent of an antisolarent, preferably selected from the group consisting of $Sb_2O_3$, $Nb_2O_5$ and $SiO_2$. $Nd_2O_3$ may be substituted for $Al_2O_3$ in greater concentrations and the total $Al_2O_3$ and $Nd_2O_3$ is 4 $\pm$ 1 mole percent. As described above, up to about ten percent of the phosphate may be lost through volatilization.

As described above, the phosphate laser glass of this invention has a high gain, providing the most efficient operation possible, athermal behavior, providing constant beam divergence, good durability, permitting water cooling and high thermal loading. Laser rods formed from the glass compositions are temperature stable, even under high thermal loading and provide excellent gain at a relatively low lasing threshold. For example, in the laser system described, the laser rods had a threshold of 9 joules or less with an output of over 800 millijoules with an input of 40.5 joules at pulse repitition of one pulse per second. The most preferred embodiments had an output of over 1000 millijoules and a stable laser beam.

We claim:

1. A temperature stable phosphate laser glass comprising a phosphate base glass composition and additions including 0.5 to 10 percent by weight of a lasing component and 0.5 to 5 percent by weight of a solarization inhibitor selected from the group consisting of $SiO_2$, $Nb_2O_5$ and $Sb_2O_3$, said phosphate base glass composition consisting essentially of the following, in mole percent:

| | |
|---|---|
| $P_2O_5$ | 55–65% |
| $Li_2O$ | 6–12% |
| $K_2O$ | 0–10% |
| BaO | 20–30% |
| CaO | 0–10% |
| SrO | 0–10% |
| $Al_2O_3$ | 1–4% | wherein the total of $Li_2O$ and $K_2O$ is less than 15 mole percent and the total of $Al_3O_3$ plus $Nd_2O_3$ as the lasing component is 4 ± 1.5 mole percent.

2. The temperature stable phosphate laser glass composition defined in claim 1, characterized in that said phosphate base glass composition includes one to three mole percent $K_2O$ and the total of $Li_2O$ and $K_2O$ is 8 to 15 mole percent.

3. The temperature stable phosphate laser glass composition defined in claim 2, in the form of a laser rod, wherein the lasing threshold is less than 9 joules using a 55 percent output reflector and said laser rod is chemically stable using a water coolant.

4. The temperature stable phosphate laser glass defined in claim 3, wherein the output of said laser rod is greater than 800 millijoules with an input of 40.5 joules when pulsed at one pulse per second.

5. The temperature stable phosphate laser glass defined in claim 4, characterized in that the laser beam generated by said laser rod expands less than ten percent at ten pulses per second.

6. The phosphate laser glass composition defined in claim 1, characterized in that said additions comprise one to ten percent by weight of the total glass composition of $Nd_2O_3$ and 0.5 to 3 percent by weight of the total glass composition of solarization inhibitors selected from the group consisting of $SiO_2$, $Nb_2O_5$ and $Sb_2O_3$.

7. A temperature stable phosphate laser glass, comprising a phosphate base glass composition and additions including 0.5 to 10 percent by weight of a lasing component and 0.5 to 5 percent by weight of a solarization inhibitor selected from the group consisting of $SiO_2$, $Nb_2O_5$ and $Sb_2O_3$, said base glass composition consisting essentially of the following, in mole percent:

| | |
|---|---|
| $P_2O_5$ | 55–65% |
| $Li_2O$ | 6–12% |
| $K_2O$ | 1–3% |
| BaO | 20–25% |
| CaO | 0–10% |
| SrO | 0–10% |
| $Al_2O_3$ | .5–4% | wherein up to ten mole percent of CaO, MgO and SrO are substituted for BaO and the total of $Al_2O_3$ plus $Nd_2O_3$ as the lasing component is 4 ± 1.5 mole percent.

8. The temperature stable phosphate laser glass composition defined in claim 16, characterized in that said glass composition is in the form of a laser rod having a lasing threshold of less than 9 joules using a 55 percent output reflector and said laser rod has an output of greater than 800 millijoules at 40.5 joules input when pulsed at one pulse per second.

9. A neodymium doped temperature stable phosphate laser glass composition, comprising a phosphate base glass composition and additions including 0.5 to 10 percent by weight of $Nd_2O_3$ and 0.5 to 5 percent by weight of a solarization inhibitor selected from the group consisting of $SiO_2$, $Nb_2O_5$ and $Sb_2O_3$, said base glass composition consisting essentially of the following, in mole percent:

| | |
|---|---|
| $P_2O_5$ | 55–65% |
| $Li_2O$ | 6–9% |
| $K_2O$ | 1–3% |
| BaO | 20–25% |
| CaO | 0–10% |
| SrO | 0–10% |
| $Al_2O_3$ | .5–3% | wherein up to ten mole percent of CaO and SrO are substituted for BaO and the total of $Al_2O_3$ plus $Nd_2O_3$ is 4 ± 1.5 mole percent.

10. A temperature stable phosphate laser glass composition, comprising a phosphate base glass composition and additions including 0.5 to 10 percent $Nd_2O_3$ and 0.5 to 3 percent of a solarization inhibitor selected from the group consisting of $SiO_2$, $Nb_2O_5$ and $Sb_2O_3$, said phosphate base glass composition consisting essentially of the following, in mole percent:

| | |
|---|---|
| $P_2O_5$ | 65% |
| $Li_2O$ | 8.5% |
| $K_2O$ | 1.5% |
| BaO | 22.5% |
| $Al_2O_3$ | 2.5% |

11. A temperature stable phosphate laser glass composition, comprising a phosphate base glass composition and additions including 0.5 to 10 percent $Nd_2O_3$ and 0.5 to 3 percent of a solarization inhibitor selected from the group consisting of $SiO_2$, $Nb_2O_5$ and $Sb_2O_3$, said phosphate base glass composition consisting essentially of the following, in mole percent:

| | |
|---|---|
| $P_2O_5$ | 65% |
| $Li_2O$ | 7.5% |
| $K_2O$ | 2.5% |
| BaO | 22.5% |
| $Al_2O_3$ | 2.5% |

12. A temperature stable phosphate laser glass composition, comprising a phosphate base glass composition and additions including 0.5 to 10 percent $Nd_2O_3$ and 0.5 to 3 percent of a solarization inhibitor selected from the group consisting of $SiO_2$, $Nb_2O_5$ and $Sb_2O_3$, said phosphate base glass composition consisting essentially of the following, in mole percent:

| | |
|---|---|
| $P_2O_5$ | 65% |
| $Li_2O$ | 8.5% |
| $K_2O$ | 2.0% |
| BaO | 22% |
| $Al_2O_3$ | 2.5% |

13. A temperature stable phosphate laser glass composition, comprising a phosphate base glass composition and additions including 0.5 to 10 percent $Nd_2O_3$ and 0.5% to 3 percent of a solarization inhibitor selected from the group consisting of $SiO_2$, $Nb_2O_5$ and $Sb_2O_3$, said phosphate base glass composition consisting essentially of the following, in mole percent:

| | |
|---|---|
| $P_2O_5$ | 63% |
| $Li_2O$ | 8.6% |
| $K_2O$ | 1.5% |
| BaO | 22.8% |
| CaO | 3.1% |
| $Al_2O_3$ | 1% |

14. A temperature stable phosphate laser glass composition, comprising a phosphate base glass composition and additions including 0.5 to 10 percent by weight $Nd_2O_3$ and 0.5 to 3% by weight of a solarization inhibitor selected from the group consisting of $SiO_2$, $Nb_2O_5$ and $Sb_2O_5$, said phosphate base glass composition consisting essentially of the following, in mole percent:

| | |
|---|---|
| $P_2O_5$ | 66.5% |
| $Li_2O$ | 8.5% |
| $K_2O$ | 1.5% |
| BaO | 22.5% |
| $Al_2O_3$ | 1% |

15. A temperature stable phosphate laser glass composition consisting essentially of the following, in weight percent:

| | |
|---|---|
| $P_2O_5$ | 59% |
| $Li_2O$ | 2% |
| $K_2O$ | 1% |
| CaO | 1% |
| BaO | 26% |
| $Al_2O_3$ | 0.5% |
| $Nb_2O_5$ | 1% |
| $Sb_2O_3$ | 0.5% |
| $Nd_2O_3$ | 9% |

* * * * *